US008031067B2

(12) United States Patent
Greenberg

(10) Patent No.: US 8,031,067 B2
(45) Date of Patent: *Oct. 4, 2011

(54) TRACKING SYSTEM AND PORTABLE VIRTUAL FENCE

(76) Inventor: Stephen Jay Greenberg, Las Vegas, NV (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/147,951

(22) Filed: Jun. 27, 2008

(65) Prior Publication Data

US 2009/0002188 A1 Jan. 1, 2009

Related U.S. Application Data

(63) Continuation-in-part of application No. 11/368,628, filed on Mar. 7, 2006, now Pat. No. 7,411,492.

(60) Provisional application No. 60/659,428, filed on Mar. 9, 2005, provisional application No. 60/668,982, filed on Apr. 7, 2005, provisional application No. 60/670,687, filed on Apr. 13, 2005.

(51) Int. Cl.
*G08B 1/08* (2006.01)

(52) U.S. Cl. ............. 340/539.13; 342/357.63

(58) Field of Classification Search ............. 340/539.13, 340/539.15, 573.1, 539.2, 539.21, 539.23; 342/357.06, 357.07, 357.09
See application file for complete search history.

(56) References Cited

U.S. PATENT DOCUMENTS

| 5,650,770 | A | * | 7/1997 | Schlager et al. | 340/573.1 |
| 5,892,454 | A | * | 4/1999 | Schipper et al. | 340/573.4 |
| 6,232,916 | B1 | * | 5/2001 | Grillo et al. | 342/357.4 |
| 6,903,682 | B1 | * | 6/2005 | Maddox | 342/357.55 |
| 7,126,475 | B2 | * | 10/2006 | So | 340/564 |
| 7,155,238 | B2 | * | 12/2006 | Katz | 455/456.1 |
| 7,292,223 | B2 | * | 11/2007 | Suprun et al. | 345/156 |
| 2001/0026240 | A1 | * | 10/2001 | Neher | 342/357.07 |
| 2002/0073933 | A1 | * | 6/2002 | Oakman | 119/721 |
| 2004/0012519 | A1 | * | 1/2004 | Durst et al. | 342/357.07 |
| 2007/0030156 | A1 | * | 2/2007 | Schlager et al. | 340/573.1 |

* cited by examiner

*Primary Examiner* — George Bugg
*Assistant Examiner* — Edny Labbees
(74) *Attorney, Agent, or Firm* — Whitham Curtis Christofferson & Cook, PC

(57) ABSTRACT

A tracking system includes a global positioning system (GPS) module and a modem for mobile communications both attached to a pet (or other trackee), and a virtual fence (which includes a base station sending a signal to a certain range and a receiver attached to the pet (or other trackee) and receiving the signal sent by a base station when the receiver is within the range of the base station). A portable virtual fence system includes a signal-sending base station, and a signal-receiver worn by a to-be-fenced pet or other trackee. Advantageously, the base station is portable. The size of the virtual fence can be expanded to fit any shaped geometry using signal repeater or transceiver devices. In addition, more than one pet can be tracked using a single virtual fence and base station. Upon confirmation that a trackee has breached the fence and should be tracked, a service center can provide location information of the trackee as well directions to the trackee by voice or transmission of mapping and other imaging displays to the responsible party seeking to locate the trackee. Power management is enhanced by either turning off the power to the tracking devices (e.g., GPS or GSM or other device) after a report, or by dynamically varying the time reports are made without deactivating the tracking devices.

6 Claims, 12 Drawing Sheets

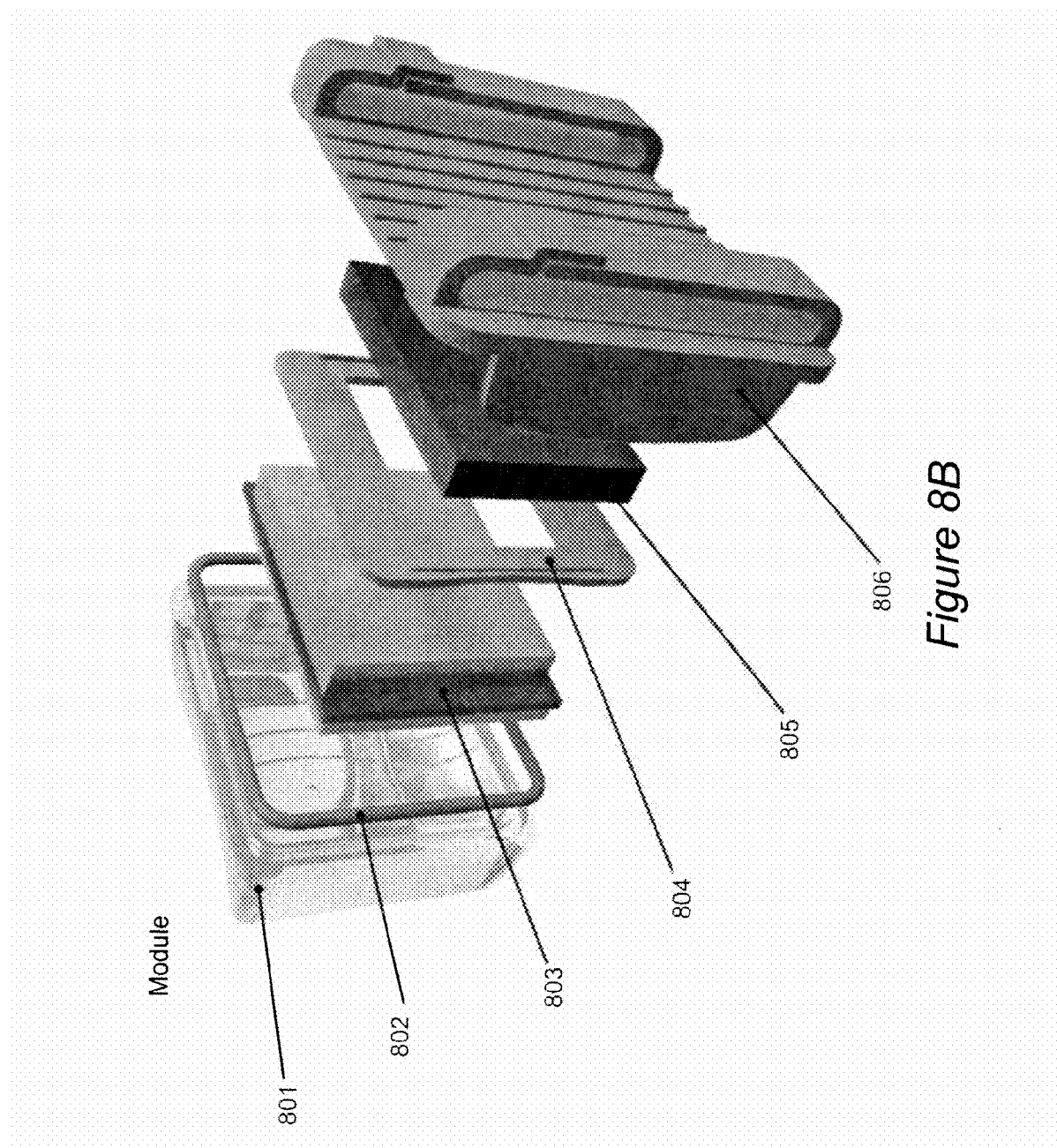

Front View

Side View

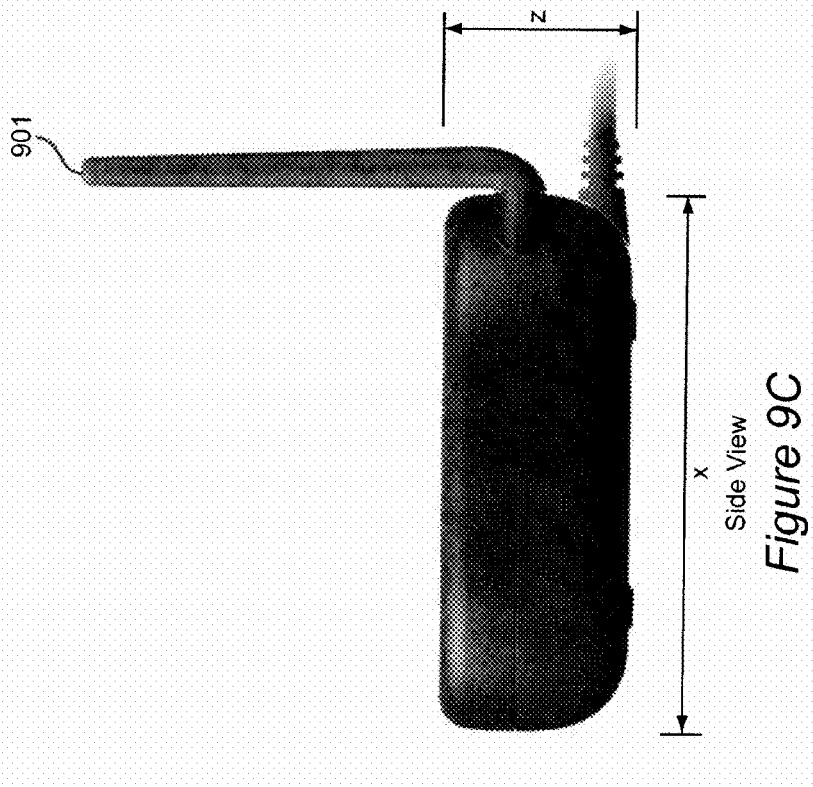
*Figure 9C* Side View
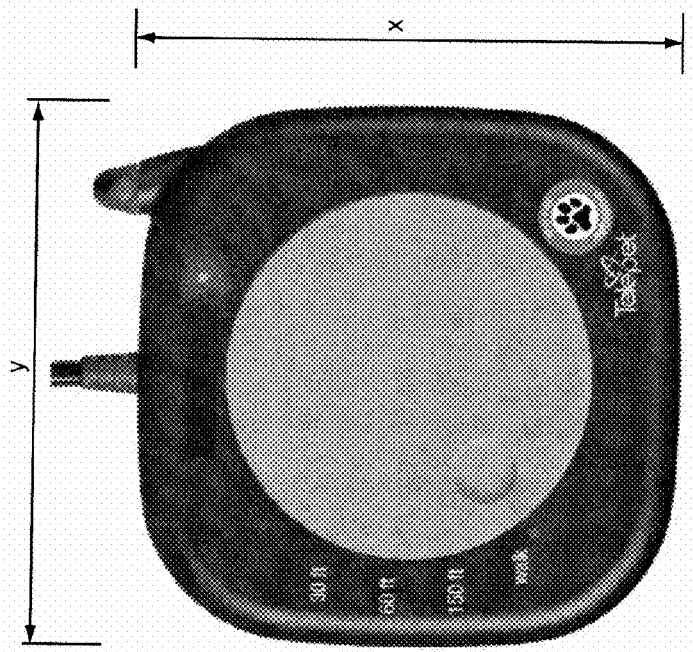
*Figure 9B* Top View

TRACKING SYSTEM AND PORTABLE VIRTUAL FENCE

RELATED APPLICATIONS

This application is a continuation-in-part application of U.S. application Ser. No. 11/368,628 filed Mar. 7, 2006, now U.S. Pat. No. 7,411,492, and claims benefit of U.S. provisional application Nos. 60/659,428 filed Mar. 9, 2005; 60/668,982 filed Apr. 7, 2005 and 60/670,687 filed Apr. 13, 2005, and the complete contents of these applications is herein incorporated by reference.

FIELD OF THE INVENTION

This invention relates to securing and tracking pets, people and objects, and especially to virtual fencing including fencing of variable geometry, as well as to location awareness processing.

BACKGROUND OF THE INVENTION

Global positioning satellite (GPS) tracking technology has been employed for tracking pets, lost objects, and people. Prior systems have many weaknesses including power consumption requirements that necessitate changing batteries every day, inability to employ alternative tracking technologies when GPS does not provide adequate tracking, and the lack of use of a service that can be selectively engaged to aid in tracking only when necessary or desired.

SUMMARY OF THE INVENTION

The present inventor has recognized that reliance entirely upon GPS-tracking for tracking missing pets, missing people and missing personal property is problematic, because who or what is missing may be somewhere unreachable by GPS-signals, and he has provided a strategic solution of mixed-use of GPS and other tracking technologies (e.g., GSM). In a preferred embodiment, the invention uses GPS tracking whenever available and, when GPS tracking is not available, automatically resorts to GSM tracking or tracking using other technologies.

A tracking module is attached to a "trackee" which can be a pet, livestock, person or an inanimate object (e.g., a possession that might be stolen). The tracking module or a base station includes a modem, transceiver, or other communications device such as a mobile communications device (e.g., a modem for a GSM protocol; a modem for a CDMA protocol, etc.) which is used to communicate with a service center. The communications device is selectively activated to communicate with the service center when the tracking module is outside of a specific area (i.e., the "virtual fence"). The size and shape of the virtual fence is variable and is dependent on the transmission range of RF transmissions between the tracking module and a base station. In one embodiment, the user of the system can adjust the range at the base station or tracking module simply by increasing or decreasing transmission power or signal strength. When the tracking module and base station are separated by a distance that is too great for the RF signal to be received, the mobile communications device on the tracking module is activated to notify the service center that the tracking module is outside of the virtual fence. The RF transmitter can be located in the base station such that when the tracking module fails to receive a signal, a mobile communications device in the tracking module is activated and contacts the service center. In this way, the tracking module only needs to provide power to a receiver or transceiver which receives signals from the RF transmitter at the base station while the pet, person or object is within the virtual fence, and it is only after the pet, person or object leaves the virtual fence that the service center is notified by the mobile communications device. However, in some configurations, the RF transmitter could be located in the tracking module, and a communications device in the base station would contact the service center when the tracking device and base station are separated by too great a distance (i.e., when the RF transmitter is out of range and RF signals are not received at the base station). p In another embodiment, one or more repeaters or transceivers could be used to enlarge the range between the tracking module and the base station and to accommodate properties having different geometries. That is, repeater stations or "transceiver stations" or "signal relay stations" can be positioned to relay the RF transmission between the tracking module and the base station. In this way, a system comprised of, for example, an animal collar with a tracking module thereon and a base station may be used in extended geographic coverage area. Any regularly or irregularly shaped geographic area may be defined by placement of signal repeaters or signal transceivers at positions that receive the RF transmission and repeat the transmission. For example, multiple repeater stations may be placed in a line of any geometry (e.g., straight lines, triangles, L-shapes, etc.) with each signal repeater or transceiver either forwarding or re-initiating a new signal representing the original signal or regenerating the original signal such that the distance or area covered by the signal sent between the tracking module and base station is greater than when no repeaters are present. The use of repeaters or transceivers has the advantages that odd shaped property lines could be covered using RF signaling and without requiring a GPS fence.

As noted above, when the virtual fence is breached, for example, by a pet getting out of its yard, the communications device notifies a service center. The notification preferably includes an identification of the tracking module. In one embodiment of the invention, there may be multiple tracking modules associated with a single base station. For example, if a pet owner had two or more animals he or she could uses multiple animal collars, each with tracking modules thereon, in conjunction with a single base station by assigning a unique digital device address to each animal tracking device operating within the same network as the base station. Alternatively, the animal tracking devices might each be pre-assigned with its on unique identification. The multiple unique addresses would permit individual collar devices to be separately monitored, tracked, and reported upon to the service center, for example, once each tracking device has been registered with service center (e.g., by storing the identification in the service center databases).

Once the service center is contacted by the communication device at the base station or the tracking module, the service center identifies the owner of the pet or object, parent of the child, or otherwise responsible party of the pet, person or object to be tracked, and contacts that party. Contacting can be done by one or more of e-mail, telephone, facsimile, text message, or any other suitable means. The service center can be a call center staffed by personnel or it can simply be a computerized center, and the service center databases would include the contact information necessary to reach the responsible party. In the context of a lost pet for example, the service center might send a text message to the pet owner indicating that the service center has received a communication indicating that the person's pet is out of its yard. This allows the pet owner to decide whether or not to track the pet.

For example, if the pet owner has taken his pet on a walk and failed to turn off the virtual fence, there would be no need to track the pet. Also, if the pet owner is too far from home to begin to search for his or her pet, there would be no need to begin tracking. While tracking by the service center could begin immediately upon breach of the virtual fence, in the preferred embodiment, tracking does not begin until the responsible party responds to the service center's notification and authorizes tracking to begin. On receiving authorization from the responsible party, the service center will send a wireless communication signal to the wireless communication device on the tracking module instructing the tracking module to activate GPS tracking (in the case of the tracking module having a wireless communication device notifying the service center of the breach of the fence, the wireless communication device which receives the GPS tracking signal is preferably the same device, and in the case of the base station having a communication device that notifies the service center, the tracking module will need a wireless communication device which receives the GPS tracking signal). In this way, substantial battery life can be saved for when power is needed most. That is, the GPS tracking device and/or other tracking devices are not activated until the responsible party (e.g., pet owner) is able to benefit from the tracking.

After tracking is begun, GPS signals are obtained at the tracking module and communicated to the service center. The service center then provides this information and/or street location information and/or maps to the responsible party. This could be accomplished by a person at a call center talking with, for example, a pet owner while he is searching for his or her pet. Alternatively, maps and other location indicating information could be transmitted from a computer at the service center to the responsible party's telephone, personal data assistant (PDA), portable computer, or other system or device suitable for receiving and processing this information. In this alternative, for example, a pet owner could walk around his or her neighborhood periodically reviewing their PDA or telephone image screen for location information indicating the location of their pet, and can see the movements of their pet on the screen. That is the service center can interact with the PDA or other device to provide updated location and direction-to-location information as to, for example, a pet's present location and can continuously provide updated directions from the owner's current location to the now current location of the lost animal. Computation and presentation of the direction to location information may be performed independently on the PDA or other wired/wireless device with the service center providing regularly updated current location information of the lost animal based on updated information from the tracking module on the pet's collar, or computation and presentation of the direction-to-location information may be performed in whole or in part on the computers of the service center and uploaded to the PDA or other wired/wireless devices of the owner. Directions may be presented via voice, digital mapping or satellite imagery, alphanumeric messaging, e-mail, or other mechanism as may suit the specific technology of the responsible party (e.g., pet owner).

When GPS signal information is not available (such as, for example, when a pet enters a drainage pipe or heavily wooded area where GPS signals cannot easily be received), the tracking module is preferably equipped with alternative tracking technology (e.g., GSM), and automatically switches to the alternative tracking technology. Location identification information obtained using the alternative tracking technology is conveyed to the responsible party by the service center in the same or a similar fashion. Furthermore, sensors can be provided to sense, e.g., darkness, such that additional systems associated with the tracking module such as lighting (flashing, continuous, colored, etc.) can be activated to assist in locating the pet, person or object Various improvements have been made for efficient power management during the tracking period (e.g., after breach, notification to responsible party, and authorization to track). These improvements are discussed in the context of a "lost pet recovery mode" but would be applicable for tracking of people and inanimate objects. The longer the elapsed period of time the device is in the lost pet recovery mode, the greater the demand is for power from the battery that supplies the energy for all of the systems on the pet collar. During this lost pet recovery mode it can be desirable that the collar device remains in an activated state during the search and until such time as the pet is back inside the virtual fence and the collar device has reestablished communication with the base station. Two simple examples serve to illustrate the benefit of enhanced power management strategy without requiring deactivation of the device:

Example: the collar device is prematurely deactivated before the collar and base station have reconnected and established a "safe" mode, then it might not be possible to reactivate the collar device in conditions such as another lost pet event after deactivation but before returning to safe mode;

Example: if the lost pet recovery mode needs to operate for an extended period of time (e.g. several hours or longer) it may be useful or necessary to dynamically alter the interval of time between reports of the pet's current location in order to conserve energy for this extended search time (the alternative to this would be premature consumption of remaining power and the unintended disabling of the collar device entirely).

In order to provide more efficient power management of the collar device without requiring deactivation, additional power management functions can be implemented that support dynamic determination of the interval of time between location reports while in lost pet recovery mode. For example, an algorithm can be used to automatically increase the time interval between location reports as the duration of the lost pet recovery mode extends beyond a dynamically set minimum threshold of time. For example: during the first X minutes of lost pet recovery mode the location reporting interval might be calculated as X/10; during the next 2X minutes of lost pet recovery mode the interval may decrease to (X/10)*3; during the next 3X minutes the interval may decrease to (X/10)*5; etc. Upon receipt of an appropriate command from the service center, prompted by the pet owner or the service center itself, the algorithm can be dynamically adjusted, such as to "reset" it to a new starting value (such as restarting at X/10 again). These dynamic values may be established by some predetermined algorithm; by variables established by particular "user profiles"; based upon remaining battery power; or some combination of all of these. Further, one embodiment could leave the collar device (tracking module) in standby (non-deactivated) state following recovery of the lost pet until such time as the pet has returned inside the virtual fence and communication has been established between the collar and base station. If the collar device were deactivated upon the initial recovery of the pet, it could then be in a state that would not support reestablishment of a lost pet recovery mode prior to returning inside the virtual fence in case of a subsequent lost pet event.

BRIEF SUMMARY OF THE DRAWINGS

In FIG. 2, the system progresses from standby mode (200), to reading SMS (210) to checking GSM/GPS track (220), to tracking (230) 15 minutes later, to an endpoint (240).

FIG. 8B is an exploded view of module 800.

FIG. 9B is a top view of the base station 900 of FIG. 9, and FIG. 9C is a side view of the base station 900 of FIG. 9.

DETAILED DESCRIPTION

Figure 6:
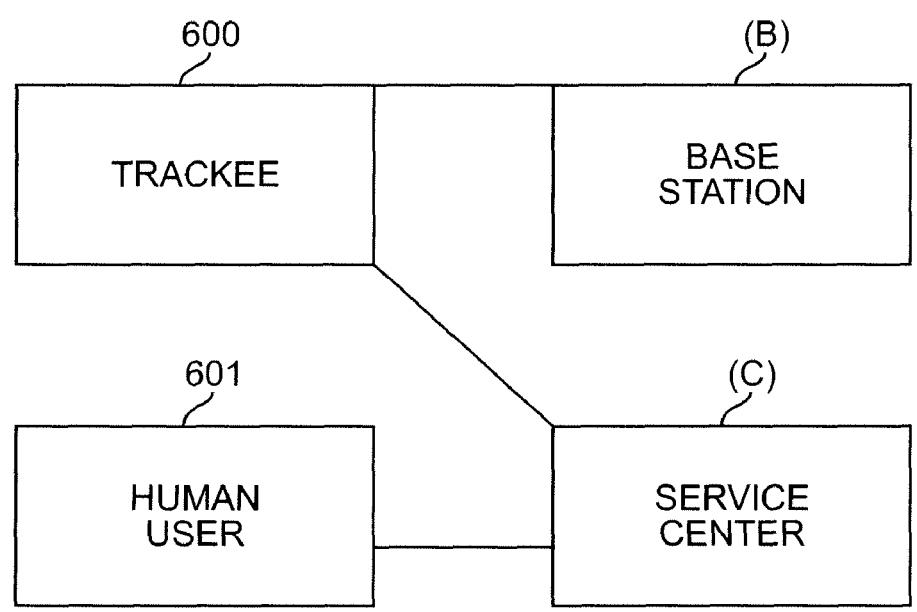
FIG. 6 is a block diagram showing the trackee 600, human user 601, base station B and service center C.

The invention provides certain methods, systems, products and devices especially suited for recovering a "trackee" (such as trackee 600 in FIG. 6). "Trackee" herein broadly refers to a living being or inanimate object which, or who, is wanted to be retained in a certain physical place and, if missing, to be tracked and retrieved. Examples of a trackee are, e.g., an animate subject (such as an animal which is a pet, a human, etc.); an inanimate object (such as, e.g. a stolen possession), etc. While tracking is preferably performed using GPS tracking devices and technologies, it is particularly preferred to be able to also track a missing trackee who otherwise would be in a location not reachable by GPS, such as, e.g., within a building, etc. However, tracking of a missing trackee is not limited to non-GPS-reachable locations, and a missing trackee may be tracked while in an area reachable by GPS. It will be appreciated that a missing trackee (such as a missing pet, etc.) will not naturally confine itself or himself or herself to an area reachable by GPS, and therefore, it is important for a tracking system to be able to reach a missing trackee even if the missing trackee is out of reach of GPS. In certain embodiments of the invention, a missing trackee may be trackable underground (such as, e.g., underground); underwater (such as, e.g. underwater); etc.

A "user" (such as user 601 in FIG. 6) mentioned herein refers to a responsible human who is responsible for or cares for the trackee, such as, e.g., a pet-owner in the case of a pet as a trackee; a parent in the case of a child as a trackee; the owner of an object to be tracked, etc.

The invention in one embodiment may be appreciated with reference to FIG. 6 which is a diagram showing that the essential elements for an inventive tracking system are: a signal-emitting base station B; a trackee 600 who physically wears a tracking device comprising at least (1) a receiver for the signal emitted by the base station and (2) preferably a mixed GPS/GSM tracking system wherein GPS is a first-resort and if GPS is unavailable GSM (or alternatively, a second non-GPS tracking technology) is resorted to; a service center C; and a human user 601.

When the trackee 600 is in the trackee's intended area (i.e., within RF signal transmission range between the base station B and the trackee 600 or within an extended RF signal transmission range supported by one or more repeaters (not shown)), automated communication 600-B occurs between the trackee 600 and the base station B.

If automated communication 600-B is not being detected, service center C becomes aware (via automated communication 600-C between the trackee 600 and the service center C) of the absence of automated communication 600-B and service center C communicates 601-C with the human user 601. Upon authorization by the human user 601, the mode of the automated communication 600-C between the service center C and the trackee 600 changes from standby mode to tracking mode. Modes are discussed further below.

In FIG. 6, the solid lines 600-B, 600-C and 601-C represent automated communication. Additionally, a human user 601 who is seeking his lost pet 600 typically visually searches for his pet 600 and eventually when he is close enough establishes personal communication 600-601 with the pet 600.

In FIG. 6, the human user 601 may have non-automated communication 601-C with the service center C, such as by telephoning the service center operator for instructions on where to seek the missing pet 600.

It should be appreciated that variations in the types of communication are permissible in FIG. 6, for more or less automated approaches, and more or less service-center involvement, depending on the equipment the user 601 has and the user's preferences. For example, if a user 601 has suitable equipment, he may want to receive automated communication C-601 from the service center which will display for him as a map showing his missing pet 600's current location. Usually in most current phones, the screen is too small to receive a map, and therefore a physical address is sent. However, if the user 601 has only access to a phone which cannot receive a map or a physical address (e.g., 12 Elm Street), then he may want an operator at the service center C to talk him through the pursuit of the missing pet 600. In one embodiment, the center employs a computerized operation where location information in the form of maps or images are transmitted to the user's PDA, telephone, portable computer or other device, and directions to the location of the trackee is also provided. This can be done by providing textual directions or graphical directions. The direction to location information can be generated by the service center and transmitted to the user, but might also be computed at the user's PDA or other device after the location information of the trackee is determined.

A global positioning system (GPS) module is used in the invention. GPS modules are known and commercially available. Examples of a GPS module are, e.g., Motorola's Encore GPS module, or other commercially available modules that pick up a GPS signal.

In the invention, a modem or other communication device for mobile communications is used. Modems and other devices for mobile communications are known, such as, e.g., a GSM modem or a CDMA modem. GSM is the preferred modem for mobile communications (e.g., GSM tracking under the trade name Cambridge Positioning Systems and MATRIX). CDMA is a GSM-alternative and also is commercially-available. Where GSM has been mentioned herein, CDMA also may be alternately substituted even if not expressly recited. If a further substitute to GSM and CDMA is developed, that also may be suitable for use in the present invention.

Figure 4:
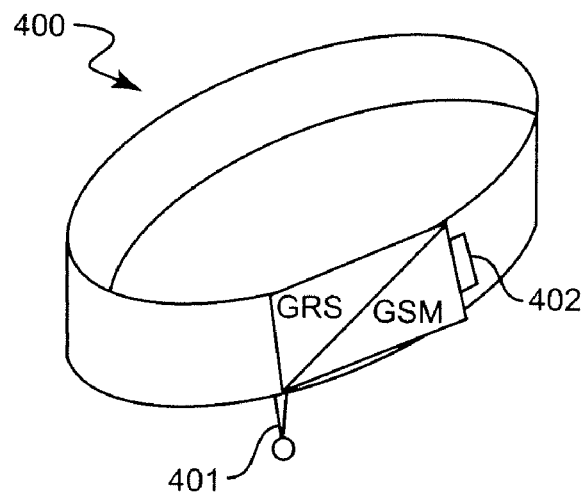
FIG. 4 is a diagrammatic drawing of a collar 400 wearable by a trackee for practice of the invention.

In the present invention, use of GSM (or CDMA) is selective and as a second-resort, namely, when GPS coordinates are not available. When GPS coordinates are available, the GPS route is used. In inventive methods, devices, systems, and products, it is preferred to switch from a GPS mode to a GSM mode, or to another location detection system, only when the GPS mode is not operational. Using GSM in such a non-preferential way as a second resort provides unique advantages, especially the ability to track a missing pet or other missing trackee when a GPS-only tracking system otherwise would be "blind" to the missing trackee. In FIG. 4, mixed use of GPS and GSM is intended to be communicated and GPS and GSM are not shown in a literal way. It will be understood that other GPS/second location technologies can be used. Further, in some applications, only GPS will be employed.

In the invention, the GPS module and the modem for mobile communications are associated with the trackee in a manner that is not particularly limited, such as, e.g., using a collar, a tag, a wearable device not removable by the wearer, etc. The manner of associating the GPS module and the modem to the trackee is selected with reference to the nature of the trackee and the application. For example, where the trackee is a pet dog, a collar or tag is preferably used. FIG. 4 shows an example of a collar 400, including a GPS component and a GSM component (the GPS component being used preferentially and the GSM component being used as a second resort when GPS is unavailable), an antenna 401 and power source 402 (preferably a battery (such as, e.g., a lithium polymer ion battery)). A collar is only shown by way of example and the invention is not limited to being practiced with collars. The components that the trackee wears may, for example, be formed into a unit, which unit is attachable to a collar. When the trackee is a pet, preferably the components worn by the trackee are housed in a chew-proof unit or otherwise protected from destruction by the trackee. A preferred material for making a chewproof unit is a chewproof plastic, most preferably Surlyn plastic made by Dupont. Where the trackee is a human (such as an offender) who may have motivation to defeat a tracking system by removal, or where the trackee is a valuable object which could be stolen, a locking system may additionally be used, as needed. In certain embodiments, maximum concealment of the placement of the GPS module, the GSM modem, the antenna and other components on the trackee may be advantageous.

For powering the GPS module and the modem worn by the trackee, a power source (402) is used, preferably a battery power source (such as, e.g., a 3.7 volt battery; a lithium polymer ion battery, etc.). The power source (402) is provided in proximity to the GPS module and the modem. The position of power source 402 in FIG. 4 is not limited to the placement shown, and any proximate placement of the power source to the components being powered is permissible.

Figure 5:
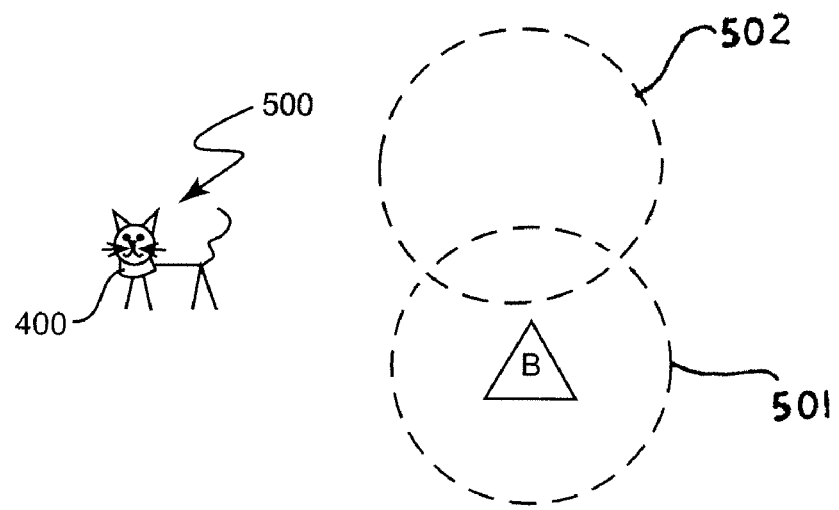
FIG. 5 (not drawn to scale) is a diagram of an inventive tracking system comprising a collar 400 and a signal-emitting base station B, and illustrating the use of overlapping signal repeaters or transceivers.

Referring to FIG. 5, in the invention, a base station B is used. The base station B emits at least a first signal (such as, preferably, a radio frequency (RF) signal) which first signal is receivable by a receiver worn on the trackee 500, provided that the receiver is in range of the base station B emitting the first signal. The range of the base station B in FIG. 5 is shown by a dotted-line circle 501. The range of the base station B can be extended by using a signal repeater or transceiver, for example, located at the center of dotted line circle 502. Thus, with repeaters or transceivers, the range can be adjusted along any line and can be a regular or irregular shape (as is the case with many property lines)

A distance (preferably a range of distances) that a signal reaches from the base station B is selected based mainly on the nature of the trackee 500 (such as a pet, an item of personal property to be protected from theft, a human being, etc.) and the area in which the trackee is wanted to be confined. For example, when the trackee 500 is a pet, preferably the signal is a signal having an adjustable range, such as a signal adjustable in a range of about a minimum of 50 feet from the base station B to a maximum of about 300 feet from the base station B. However, in other embodiments, different signal ranges may be used. For example, for a pet living on a large property, a larger maximum distance than 300 feet may be wanted. In FIG. 5, the trackee 500 is drawn as a 4-legged animal, but it should be appreciated that the trackee is not so limited and can be a person, an inanimate object, etc.

The base station B that has been mentioned for use in the invention, preferably is physically placed in an indoor or protected location, such as, e.g., inside the residence. For properties on which the residence is not centrally located, if wanted, the base station B may be placed in a protected location other than inside the residence and, if necessary, a housing for the base station B may be constructed. The base station B preferably is "portable," namely, is of a size, shape and detachability which permits its movement with relative ease by the user, such as for easy movement, in a usual family automobile or vehicle, requiring no more space than a piece of luggage. For example, the desired movement may be between a main residence and alternately a vacation spot. A "portable" base station B means that it may be moved without any digging activity. It will be appreciated that the base station B may, in less preferred embodiments, be non-portable. When the base station B is made portable, advantageously there may thereby be provided a portable virtual fence.

An example of using a signal-sending base station with a receiver on a trackee is the following multi-mode system, which comprises: a first mode which is a low-power mode which operates while a signal is received indicating that the receiver on the trackee remains within range of the base station; a second mode which is a standby mode (such as, e.g., a standby mode that is engaged when no signal indicating that the receiver on the trackee remains within range of the base station is received; a standby mode that is engaged during a walk mode when a switch on the base station sends a signal acknowledging that the receiver will be leaving the range of the base station; etc.); and a third mode which is a lost trackee mode which is activated upon user authorization. (such as, e.g., user authorization which is a user's affirmative response to an inquiry to the user for whether the pet should be tracked; user authorization which is the user reporting loss of the trackee, etc.). In the lost trackee mode, a dynamic power management mechanism may be used where the time period between reporting on location information varies the longer one is looking for the lost trackee (e.g., reports might be made at shorter intervals in the beginning, then longer intervals the longer one looks—further, provision may be made for the user to notify the service center to provide reports during shorter period intervals on demand during the lost trackee mode).

One example of using a standby mode is as follows. A signal indicating that the receiver on the trackee remains within range of the base station is at a first frequency. A signal acknowledging that the receiver is leaving the range of the base station is at a second frequency which is different from the first frequency. The standby mode is engaged upon (1) non-receipt of the first frequency signal indicating that the receiver on the trackee remains within range of the base station or (2) receipt of the second frequency signal. The second frequency signal may be activatable via a switch on the base station so that a user switching the switch activates the second frequency signal when taking the trackee for a walk out of range of the base station.

The base station may include a switch on the base station for a user to switch the signal from low-power to standby mode. Including such a switch on the base station by which a user can switch to change the signal from low-power to standby mode, is particularly suited to providing a system useable as a portable virtual fence.

Examples of a lost trackee mode are a lost trackee mode including a GPS mode with a GSM tracking mode; a lost trackee mode including a GPS mode with a CDMA tracking mode; etc. Preferably, lost trackee mode includes a GPS mode and a GSM tracking mode, wherein GPS mode is primarily used and GSM tracking mode is used only when GPS mode is not operational.

A multi-mode system optionally may include a fourth mode which is a battery alert, wherein a message is sent to the appropriate person advising him or her to effect a battery change.

A multi-mode system optionally may include a five mode, which is a self-test mode after a battery has been replaced. Such a self-test mode is advantageous because, when the battery is removed from the unit worn by the trackee, the unit shuts down, and, upon replacing the battery, it is advantageous for the unit to self-test.

For further improving the advantageous results of using the present invention, preferably, the trackee has attached thereto one or more optional features that aid detection of if the trackee goes missing, such as an optional light system which is selectively activatable when the trackee is being searched-for (such as, e.g., a light system that comprises at least one light emitting diode (LED) that emits light while the missing trackee is being tracked); an optional audio system which is selectively activatable when the trackee is being searched-for. It is particularly preferred in the inventive tracking systems to attach, to the trackee, a light system which is selectively activatable, especially when the trackee is a pet.

Some non-limiting examples are as follows, without the invention being limited to the examples.

EXAMPLE 1

Figure 1:
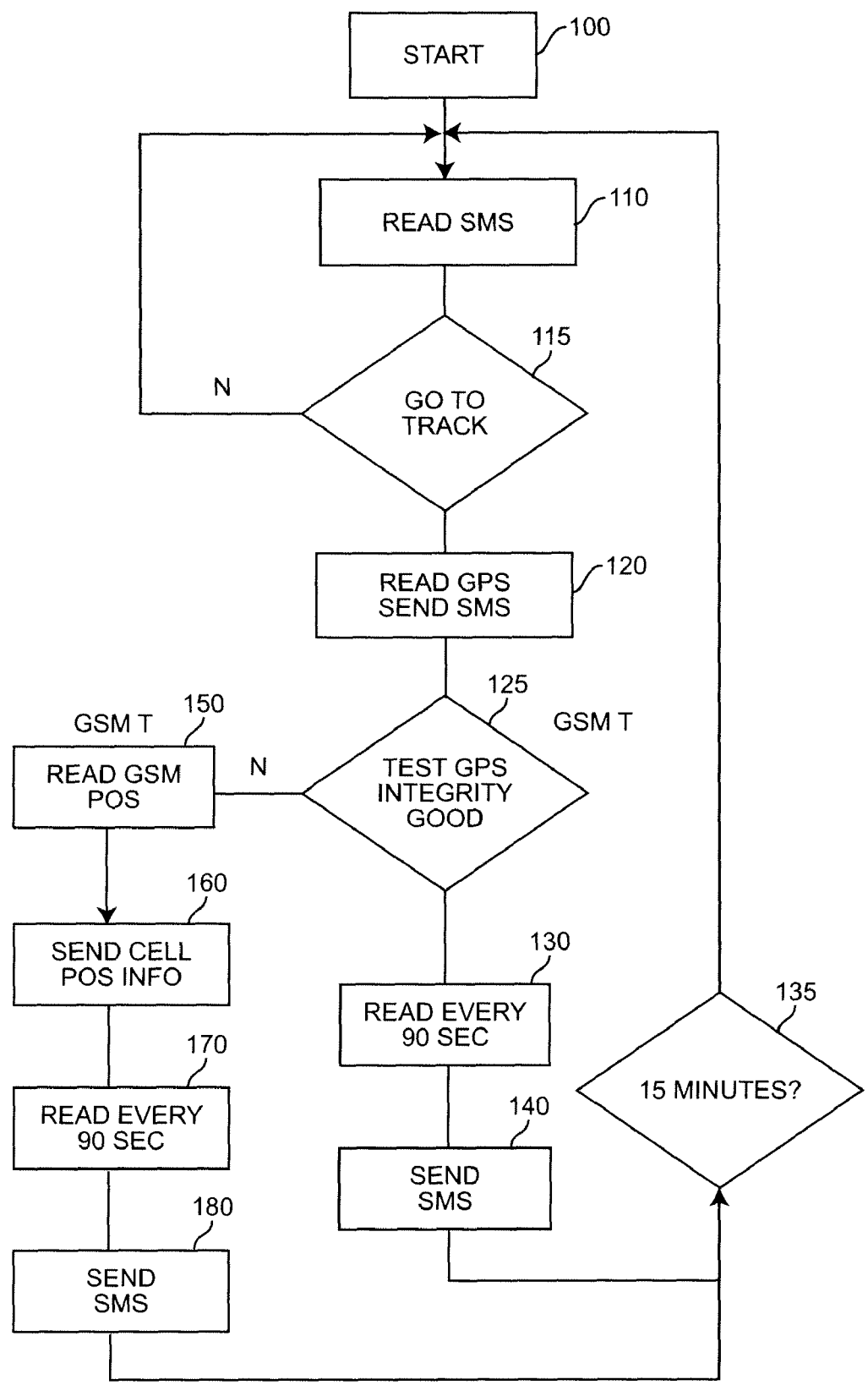
FIG. 1 is a flow chart of an inventive tracking system in which GSM is used, including a start step (100); a read SMS step (110); a go to track step (115); a read GPS/send SMS step (120); a test that GPS integrity is good step (125); a read every 90 seconds step (130); a send SMS step (140); a read GSM position step (150); a send cell position info step (160); a read every 90 seconds step (170); a send SMS step (180); and a 15 minute-based step (135).
Figure 2:
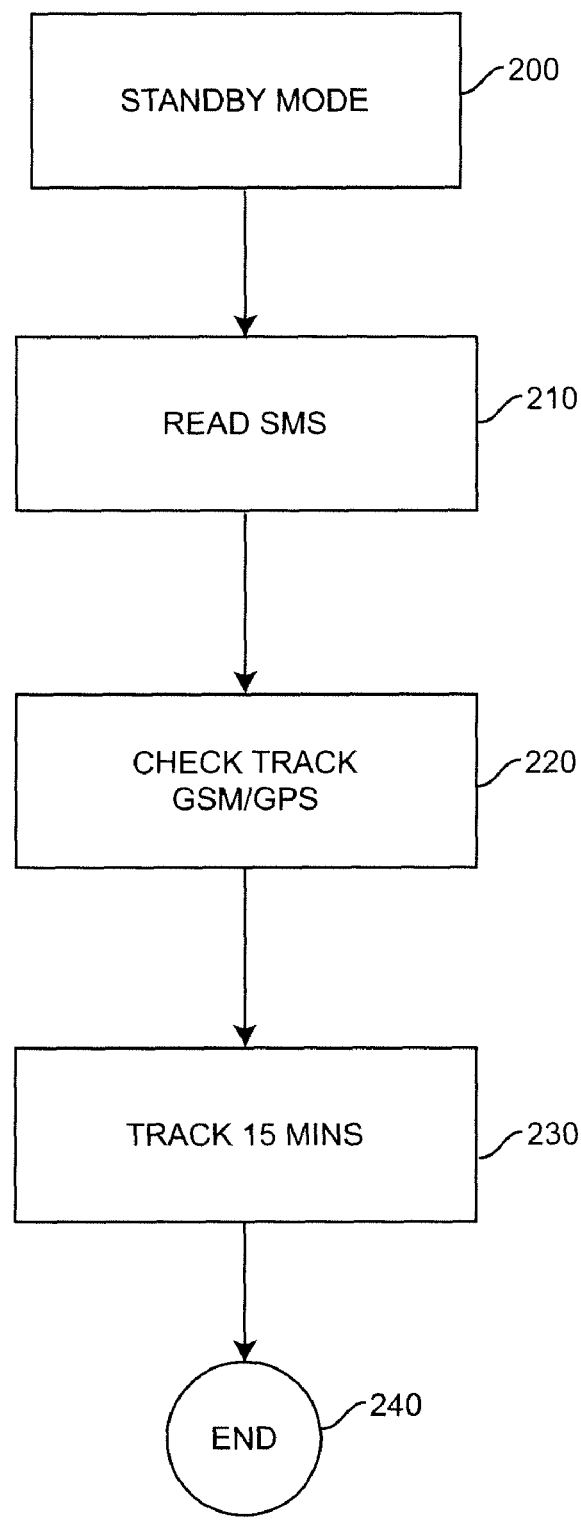
FIG. 2 is a summary flow chart useable with FIG. 1.
Figure 3:
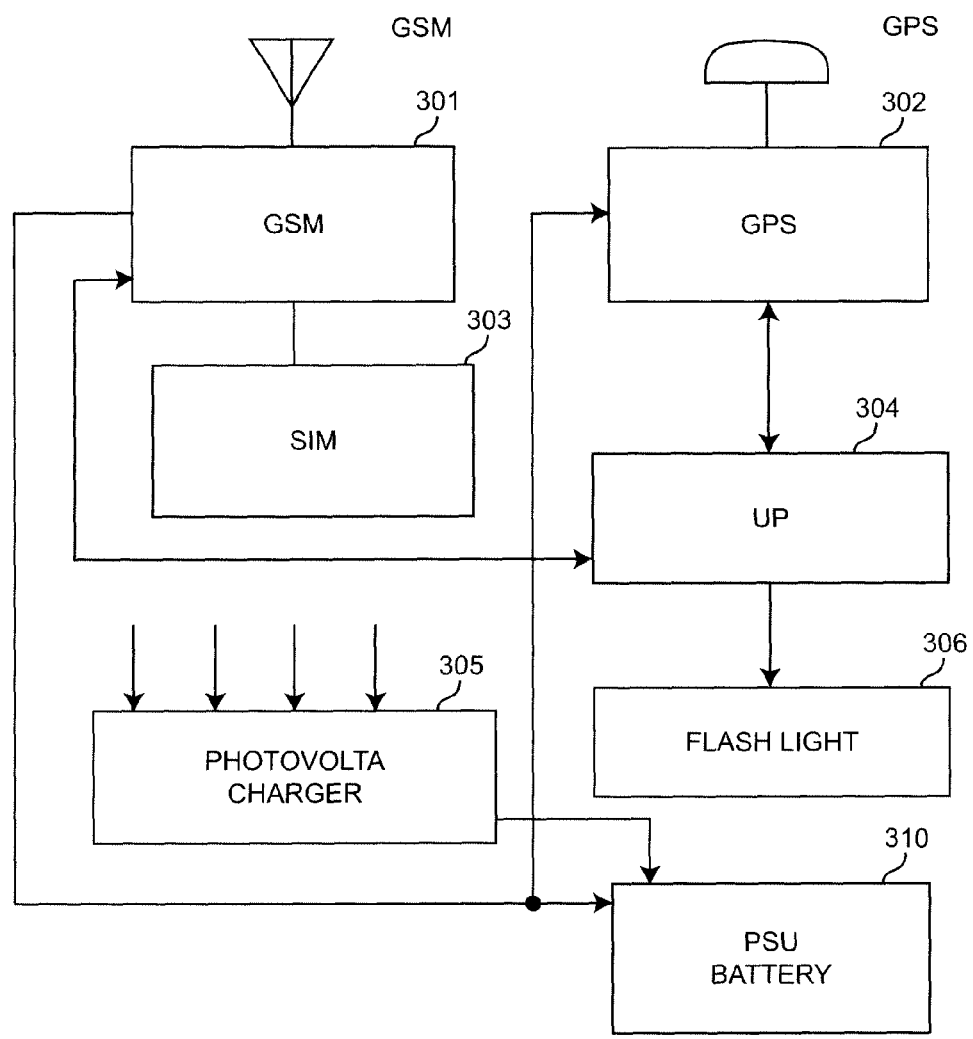
FIG. 3 is a block diagram of an inventive device to be worn by a trackee (such as, e.g., on a collar) in an inventive tracking system using GPS and GSM. The device of FIG. 3 comprises GSM (301), SIM (303), GPS (302), microprocessor (304), flashlight (306), battery (310) and optional photovoltaic charger (305) which are connected as shown.

An inventive animal tracking system is configured according to FIGS. 1, 2 and 3, and is constructed according to the following equipment specifications:
Battery: 3.7 V
AH: 2.1 A
Standby: ~10 days
Solar charger: 4.8 V
GSM Frequency: 850, 900, 1800, 1900 MHz
GPS Frequency: 1575.42 MHz
Warning devices: high-intensity LED and sounder Referring to FIGS. 1, 2 and 3, a tracking device is fitted to the collar of a dog to enable tracking and retrieving the dog should it be lost or stolen. Satellite position information as well as GSM tracking is used to send and receive commands to and from the unit fitted to the collar.

System Operation

Referring to FIG. 3, the system is controlled by a microprocessor 304, which acts as the housekeeper or the brain of the operation. The microprocessor 304 contains a program that controls the states and modes of the electronic devices comprising the tracking system. The microprocessor 304 generally runs in a low power or trickle mode.

Referring again to FIG. 3, typical tasks for the microprocessor are waking up×times per day and doing a status check or self-test of the GSM 301, GPS 302 and SIM card 303, as well as the antennas, and the battery 310. Depending on the preset conditions, the unit sends a report of "all OK" or "battery below 50%" back to the control room or the owner. The system keeps the control centre number permanently stored and two more reprogrammable numbers of the owners.

For communication, the system uses a GSM engine 301 placed into low power or semi sleep mode, to minimize power use. The system reads any incoming messages from the network with a very small delay time.

The GSM unit 301 will go into full power mode when the system moves between cells and has to log onto a new cell, or when a message is received. The rest of the time, the unit remains in low-power mode as much as possible. The unit uses very low power standby power consumption.

Active Mode

Whenever a signal is received to track the unit, the microprocessor (304) turns all systems on as instructed, and gets a satellite fix using the GPS (302). The GPS (302) is completely switched off during normal operation (i.e., when the pet is fenced) and is only switched on during a tracking exercise. The GPS (302) needs ~60-90 seconds to lock onto the satellite signals and determine a position fix (if good GPS satellite signals are received). The GPS (302) then continually tracks the position of the animal unless instructed otherwise. The GPS (302) goes into full operational mode, determines the position, and reports the position to the microprocessor (304), which in turn sends the position fix back through the GSM network.

Once the position fix is acquired, the GPS (302) is placed into a power-save mode where the signal is read at small intervals in time but not continually. The calculation engine is kept running but no information is shared to the outside world. The system is still deemed active and not in sleep mode.

No GPS Fix

If no good signal from the GPS is found, the GPS (302) will report a last known good signal stored in memory. The GPS (302) will then report a bad signal during transmission. If the GPS (302) fails in receiving a good signal, the unit is put into a longer read cycle to save battery (310) power. The unit then occasionally switches on and tries to acquire a position fix.

Switch GSM

Once GPS fix is not available, the unit goes over to a full GSM (301) tracking mode where as much of the cell information available to it at that stage is sent back to a calculation engine that does the location of the device based on the network information as well as the recovered information from the tracking device. The information can be published on a map, placed on the web, made known to the owners, or kept in the control room as required. The end result is a position of ~2-50 m diameter.

If the GSM tracking and the GPS tracking data is only sent to the control room where it can be processed and made ready for clients, the clients with a missing pet must use the system to find the missing animal and cannot find the animal on their own. Alternately, tracking data can be sent so that the clients can find the animal on their own.

Using a moving map system, the recovered position from GSM or GPS is plotted on the map, indicating the plot with a unique symbol.

GPS Tracking

Using GPS tracking relies on the fact that the dog is moving outside in the open and that the GPS receiver can see the satellites for a period of at least 60 seconds during the time of switch-on (which is the acquisition period on cold start after the unit has been moved to a new location). A very-high sensitivity unit preferably is used that can track the satellites when facing towards the ground. When the animal is wearing the device, the antenna will tend to point down towards the ground.

Using GPS tracking, the system needs to see at least two satellites or more to do an accurate positioning by calculating the time difference between the satellite signals. Expected accuracy for a GPS system looking at the ground is ~20-50 meters which is more than good enough for this application.

GSM Tracking

By using the GSM unit alone, use can be made of network cell information from the radio network to determine the position of the device. As the microprocessor on the tracking system is limited in size and battery power, the raw network information is sent to the control centre where a computer running a calculation engine calculates the position using the information of the known network and that recovered from the tracking device.

By collecting the information in the GSM module (301) and sending the surrounding cell information back to the control room, the position of the device can be determined down to 20 meters. Some information and cooperation is required from the network operators in the areas covered.

By using GSM tracking as needed, advantageously, the unit is trackable inside buildings, under roofs, even underground (e.g., parking areas). A rough indication can be sent and then followed by more detailed information using as many measurements of the surrounding cells as possible.

The GSM (301) system usually goes to full power mode to recover the tracking information as the unit moves. The GSM position information typically requires almost a full SMS length to send back a single plot. The unit is programmed at the frequency or intervals the information has to be sent. Each send draws battery (310) power as the unit has to go into full transmit mode, so this feature has to be used sparingly until the recovery team or family are close to the animal.

Tracking Using Lights

Lights (306) are activated when the device goes into lost-pet mode. Tracking using lights (306) is especially effective at night. Bright LEDs can be seen for at least 100 meters provided that they are pointing towards the observer and are unobstructed by local objects.

When the animal is hiding or inside a house, visual tracking will help locate the animal in a dark corner. Care has to be taken about using the lights (306) and the repetition frequency as these can draw a substantial current from the battery (310).

Network

To operate the tracking system, a very simple network system can be used. To minimize cost while still having efficiency, a single GSM modem is used, connected to a personal computer using serial or USB ports. Whenever the unit transmits, or needs to be activated, a simple command is typed on the computer and sent directly via the GSM network as a regular SMS. The SMS is processed through the service provider as any other SMS and is sent to the unit. The only drawback with such a system is that the message can wait for delivery inside the SMSC depending on the workload of the system at that time. To overcome this, the service provider can provide a different SMSC number that can be used. High priority services running for customers are available, and this application can be placed onto this system. Delivery times for most service providers were ~2-5 seconds (guaranteed by most). The message is generated through the tracking device and sent back using the same way to the priority SMSC number back to the GSM modem in the control centre. This is a low-cost small tracking system. The single modem can easily handle up to 500-1,000 users with ease. Feeding the information back to a single PC allows the tracking to be done quite successfully using one modem and one PC.

To expand the system, more modems are added per control room. By using port expanders or low cost PCs up to 20 modems' information can be fed to a server that processes the data coming in. When more users in other towns are added, the control rooms are set up in that town using the same system.

As a recovery or tracking team is needed in most cases, the ideal place for a control centre PC is with small patrol agencies or security companies with 24-hour staff.

As the system is digitally based, recording the incoming information gives full trackability. The service provider can keep a backup record that can be retrieved from the SMSC server, and the control center can log all entries, even if people do not respond to them.

To provide a huge centralized control centre for the whole of the US, a dedicated line or aggregator arrangement with a service provider through an external party is used.

Control Centre Computers/Servers

When the modem has delivered the incoming position data from an identified device, the data is converted to a position that can be read and interpreted by humans. The information is tagged (ID) and then displayed on a map or satellite map such as Google's "keyhole". Software such as GPSS from www.gpss.co.uk may be used. As the message is received it is converted and the map zoomed in or out and moved so that the position can be seen. A symbol is then placed at that location.

If GSM tracking is used, the calculation engine on the PC (a software program) calculates the position and then converts that to a standard mapping input. The map is then manipulated in the same way as the GPS maps.

Several mapping options are available. Care should be taken that the maps can move according to GPS inputs, and must be able to display more than one Id number per map.

As the system grows, a dedicated server or PC can be used to process information of every area and assist with the tracking thereof.

User Interface

The most interactive way for users to play and test the system is to either call the operator and manually activate the signal to tell them where the animal 500 is, or to use a fully automated system where the inputs for the system can be given using a web browser, and the result displayed to the user in the form of a map on his/her personal home computer.

EXAMPLE 2

Referring to FIGS. 1, 2, 3, this Example is a system that includes tracking and communication components secured to a collar worn by an animal such as a cat or dog. These tracking and communication components include a radio frequency (RF) antenna, a global positioning system (GPS) module, and a global system for mobile communications (GSM) module, all of which are powered by an on-board battery pack. The battery pack is re-chargeable. An RF transmitter or transceiver is positioned on the battery pack charger, and the pet owner puts the battery pack charger within his or her residence, or within a vacation home or hotel to which he or she is traveling, or at any other suitable location where the ability to detect the unplanned absence of the pet is desired.

In operation, the RF antenna on the collar is always active. While RF signals from the battery pack charger are received from RF transmitter or transceiver, the GPS module and GSM module are not operational, to conserve battery power. Once the RF receiver is out of range of the RF transmitter or transceiver, as would be the case when the cat or dog strays beyond a certain boundary (defined by the signal radius of the RF transmitter or transceiver), firmware within the collar mounted system causes the GSM modem within the GSM module to transmit, via a GSM antenna, a message to the tracking service indicating that the pet is outside the boundary area which signifies that the pet might be lost. This message is sent through the Cingular wireless network, and is of the small message system (SMS) type (text messaging). The tracking service is able to identify the missing cat or dog from the information transmitted by GSM that is obtained from the subscriber identification module (SIM), which is unique to each unit (i.e., the transmitted information from the GSM modem of each animal uniquely identifies the animal).

The service then sends to the pet owner a notification that the pet may be lost. This notification can take the form of any or all of the following: 1) a text message to the owner's cell phone; an email to the owner's email address; and/or 3) a facsimile to the owner's facsimile.

After the pet owner receives the message, the pet owner will then contact the service to request assistance in tracking the pet. This can be accomplished in a number of different ways. As one example, the pet owner telephones the service center and speaks with an operator. Once the operator responds to the call, the owner identifies his or her pet by providing a personal identification number (PIN) or other secure identification code. As another example, the pet owner logs onto a web site operated by the service center, and sends a message that his or her pet is lost (such as by clicking on a button that indicates the person's pet is lost). The person is then presented with a page that allows him or her to enter identification information for the pet. As another example, the pet owner has a java script enabled telephone which allows him or her to dial up the service and enter the identification information directly.

Once the service has received a communication from the pet owner that he or she requests assistance in locating their pet, the service sends a text message to the GSM module located on the pet's collar. This message causes the firmware to turn the GPS module on. (When tracking is in progress, the pet's collar is determining its location via GPS (or GMS, if GPS is not available) every 90 seconds (130, 170 in FIG. 1) for 15 minutes (135 in FIG. 1; 230 in FIG. 2). When latitude and longitude coordinates are determined at the GPS module on the pet's collar, information corresponding to these coordinates is sent as a message to the service using the GSM module. (140, 180 in FIG. 1.) The location data is transmitted to the service without ever being stored in memory on the pet's collar. Communications between the service and the pet's collar are via SMS text messaging (e.g., 120, 140, 180 in FIG. 1) over Cingular.

With the coordinate information, and using mapping facilities at the service, an operator at the service is able to tell a pet owner by telephone where his or her pet is located. Further, the information the service operator is able to convey is in real time or near real time, such that a pet owner can be told, based on coordinate information obtained from the GPS and mapping software operated at the service, in which direction the cat or dog is moving. With java script enabled phones, the pet owner is simply presented with a map of where the cat or dog is located (in this way, the pet owner is serving as his or her own operator).

Back up measures also are provided to assure that the tracking system of this Example functions properly. In particular, if the GPS system does not locate the cat or dog within one minute of the service sending a message requesting coordinates, GSM tracking is employed to locate the missing pet. GPS is highly accurate, but signals may not be detected when the pet is hiding in a building or in densely wooded areas. In these situations, GSM tracking, which is less accurate but which is effective in situations where GPS is ineffective, can provide information that is used by the pet owner to locate his or her pet. In this case, pet location information is provided to the pet owner from the service in the same way as set forth above in this Example 2. Also, firmware causes a light emitting diode (LED) strobe light to emit pulsed illumination from LEDs located at the cat or dog's collar, once the cat or dog is determined to be missing. The LED strobe can be turned on automatically via the messages sent from the service after the owner has contacted the service to confirm the pet is missing.

The inventive system of this Example operates according to a low battery protection scheme to assure that the device remains operational. When a low battery situation is determined by the firmware at the cat or dog's collar, a message is sent by the GSM modem to the service. In response, the service sends one or more of a text message, a facsimile, and/or an email to its customer (the pet owner) to notify him or her that it is time to change and/or recharge the battery. Upon changing of the battery by the pet owner, the firmware causes a self-test to be performed, and information concerning the status of the battery and other features of the system are sent by the GSM modem to the service to indicate that the system is operational and that there is a full charge on the battery. The service then confirms this to the customer by sending to the customer one or more of a text message, a facsimile, and/or an email so that the customer is assured the system is functioning properly. The device now re-establishes itself with the base station, i.e., RF "pairing."

EXAMPLE 3

An inventive chew-proof tracking unit attachable to a pet collar is provided in this Example. The unit attaches to a standard pet collar. When a charged battery is installed in the unit, the unit performs a self-test and sends the results, through the GSM modem, to the service center and is logged in that units data file, time and date stamped, at which time the unit is active.

The unit comprises a GSM modem, a GPS module, a printed circuit board, firmware, three active antennas (RF for communication with the base station, GSM and GPS), an LCD strobe light and a battery, plus connectors, all housed in a chew proof plastic housing.

The unit of this Example is used in cooperation with a base station as follows. The base station of this Example is a battery charger as well as an RF transmitter. The RF signal is modifiable by a switch by which to adjust the radius of the RF signal from about 50 feet to about 500 feet. This RF signal provides the virtual fence. When the unit's RF antenna is receiving this RF signal from the base station, the unit shuts down all other internal components to conserve energy. Thus, the battery life between charges is extended compared to if any additional power-using components were not shut-down. The longer the pet is in range of the RF signal from the base station, the longer between battery charges.

If the pet leaves the virtual fence area and the RF antenna on the pet ceases to pick up the RF signal from the base station, the firmware turns on the GSM components and sends a text message to the owner's cell phone that the pet may be lost.

The firmware then waits for a text message from the pet owner that in fact the pet is lost, and, upon receipt, the firmware places the unit places the unit into the lost pet mode. When this text message is received by the unit on the lost pet, the GPS module is turned on and the GPS module tries to get a longitude and latitude fix, which pinpoints the location where the pet is. The unit on the pet sends these coordinates in a text message to the service center, the user's home, or user's cell phone, where a mapping component pinpoints the location of the pet on a computer screen or cell phone screen. The owner now goes to find the lost pet. This location updates itself every 75-90 seconds, on the screen, with a color marker.

If the GPS cannot get a fix within 1-2 minutes, the firmware switches to GSM triangulation, another way to get a longitude/latitude fix, using GSM cell sites. This GSM approach is less accurate than GPS, but will find the pet in areas where GPS has too weak of a signal, such as under overhangs, in buildings, etc. In lost pet mode, the firmware also turns on the strobe light so the owner will have an easier time finding the lost pet, especially at night. This lost pet mode stays on for 15 minutes.

In this Example 3, the base station has a toggle switch that changes the RF signal from a virtual fence signal to a signal that tells the unit to turn on the GSM components, thereby permitting the owner to take the pet for a walk or somewhere away from the virtual fence without any unnecessary text message being generated that the pet has left the virtual fence area and sent to the owner's phone.

In this Example 3, a battery monitoring system is included that sends a message to the owner's cell phone, fax and email that the battery is low and that it is time for a battery change.

EXAMPLE 4

Use of Tracking Systems by Neighbors

The invention may be used by neighbors in nearby homes as follows. In this Example, inventive tracking systems are used by neighbors in row-homes, town-homes, attached villas, or in other homes in close proximity. Each neighbor has his/her own base station, with its own RF signal which differs from the RF signal used by the neighbor.

EXAMPLE 5

This Example addresses the situation where a pet has gotten loose, and the owner's cell phone which receives the SMS text message advising of the pet's situation is in a turned-off state. In this Example, after a predetermined period of time (such as 15 minutes), shut-down of the unit on the pet occurs, because it is wanted not to waste the unit's power. However, later, when the owner turns his or her cell phone back on, a message is sent to the unit on the pet to turn-on.

EXAMPLE 6

In this Example, a feature is added on the unit worn by the pet that mimics a non-electronic pet tag or microchip, by providing a notification that displays that the pet is lost and displays a toll-free number for someone finding the pet to call. Such notification is not required to be automated or electronic and can be non-electronic, such as printed, engraved, embroidered, etc.

EXAMPLE 7

Household with Multiple Pets

In this Example, a household has two or more pets, each pet serviced by the pet's unique base station, so that the number of pets in a household equals the number of base stations. Each base station and each device will search for an RF signal and will pair. Once a base station-device pair is established, the paired base station will not pair with another device and the paired device will not pair with another base station. That is, there is a one-to-one pairing of base station with device. In walk mode, a base station sends a signal that is only recognized by the device with which that base station is paired. Upon one pet (or more pets, such as if two or more pets unauthorizedly exit the property together), the respective unit on each exited pet will go into lost-pet mode and each lost pet's unit will contact the pet owner to announce the situation.

EXAMPLE 8

In this example, the base station is replaceable (such as if the base station is left on vacation) as an independent piece. A new base station may be purchased and will pair with any pet unit not already paired to another base station that is present.

EXAMPLE 9

Power Management and Conservation

A conventional tracking product worn by a pet requires much turning-on to find longitude and latitude, which results in much power usage. Typically a conventional product will deplete a battery in about 1½ to 2 days.

By contrast, the invention, with its inventive power management system, avoids much of the turning-on to find longitude and latitude needed by conventional systems. In this inventive Example, the lost pet mode is the most power-consuming of the modes, and power usage in that mode is minimized. By using an inventive tracking system comprising an inventive power management system, battery life on the pet unit may be extended about 8-10 fold compared to a conventional tracking system on a pet, by eliminating many of the turn-ons of the conventional systems. This extension of battery life, correspondingly, extends the battery life from a conventional product's battery life of about 1½ to 2 days, to an extended life, for the invention, of about 14 to 16 days.

EXAMPLE 10

In this Example, the characteristics of the property where the trackee is moving is considered. An inventive tracking system based on at least one RF signal is not limited with respect to whether the trackee encounters bodies of water. For example, the trackee wearing an RF-signal receiving device can safely move about a property with bodies of water.

Preferably the device worn by the trackee is waterproof (not just water resistant), so that the trackee (such as a pet dog) can jump in water without the device needing to be removed.

EXAMPLE 11

In this Example, an advantageous snap-on system is provided, for snapping the electronic device worn by a pet to a collar receiving the device. The snap-on attachment resembles a safety pin system. The device is provided with loops, like on a ball-point pen.

Figure 8A:
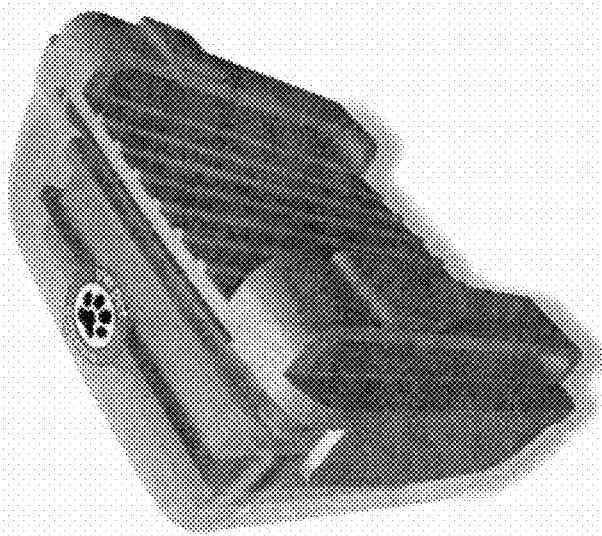
FIG. 8A is a back view of module 800 of FIG. 8.
Figure 8:
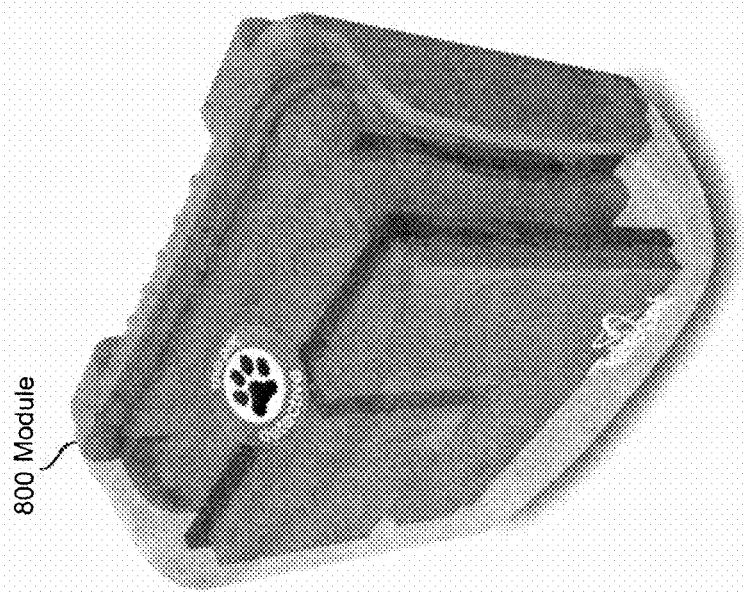
FIG. 8 is a front perspective view of an embodiment of an inventive module 800, in assembled form.
Figure 8D:
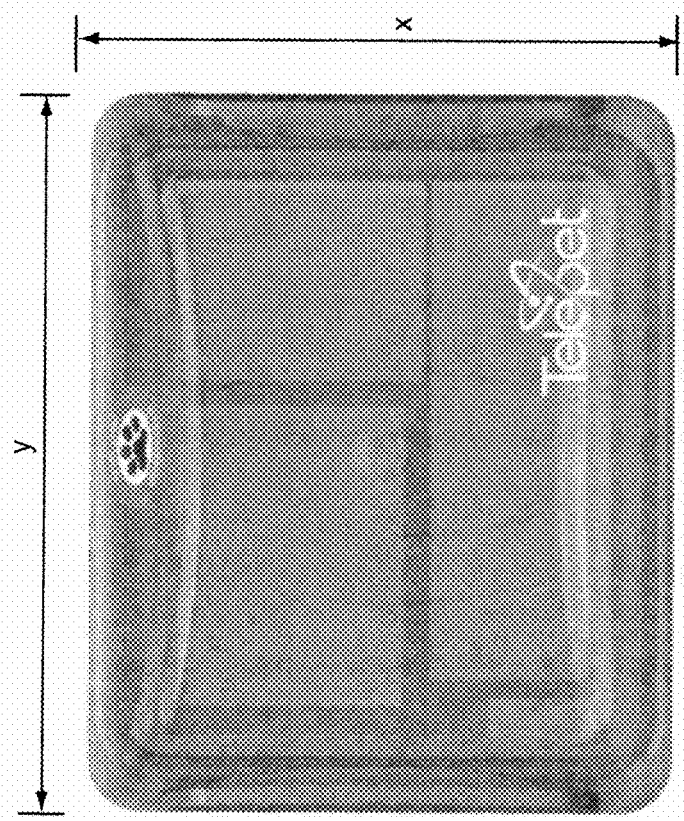
FIG. 8D is a top (front) view corresponding to FIG. 8C.

Referring to FIGS. 8-8D, module 800 includes front housing 801, seal 802, PCB 803 (screwed down with the inner tray 804), battery 805, and battery door 806.

Figure 8C:
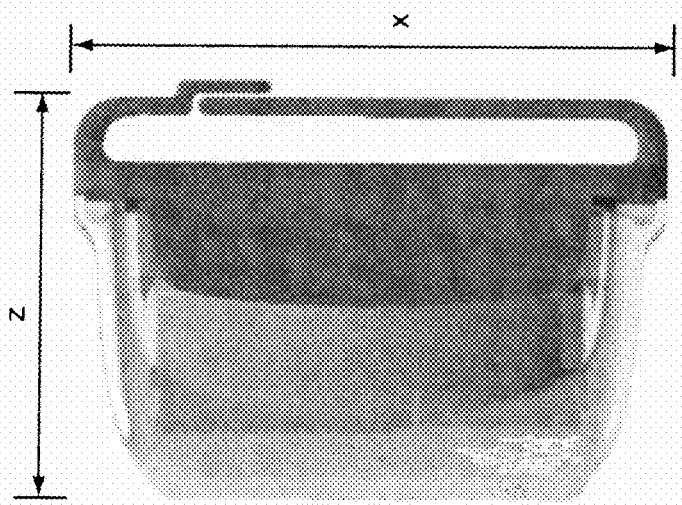
FIG. 8C is a side view of module 800 of FIG. 8.

Referring to FIGS. 8C and 8D, dimensions x, y and z are shown.

EXAMPLE 11A

Referring again to FIGS. 8-8D, in a preferred example, x=44 mm, y=54 mm and z=31.5 mm.

EXAMPLE 12

Figure 7:
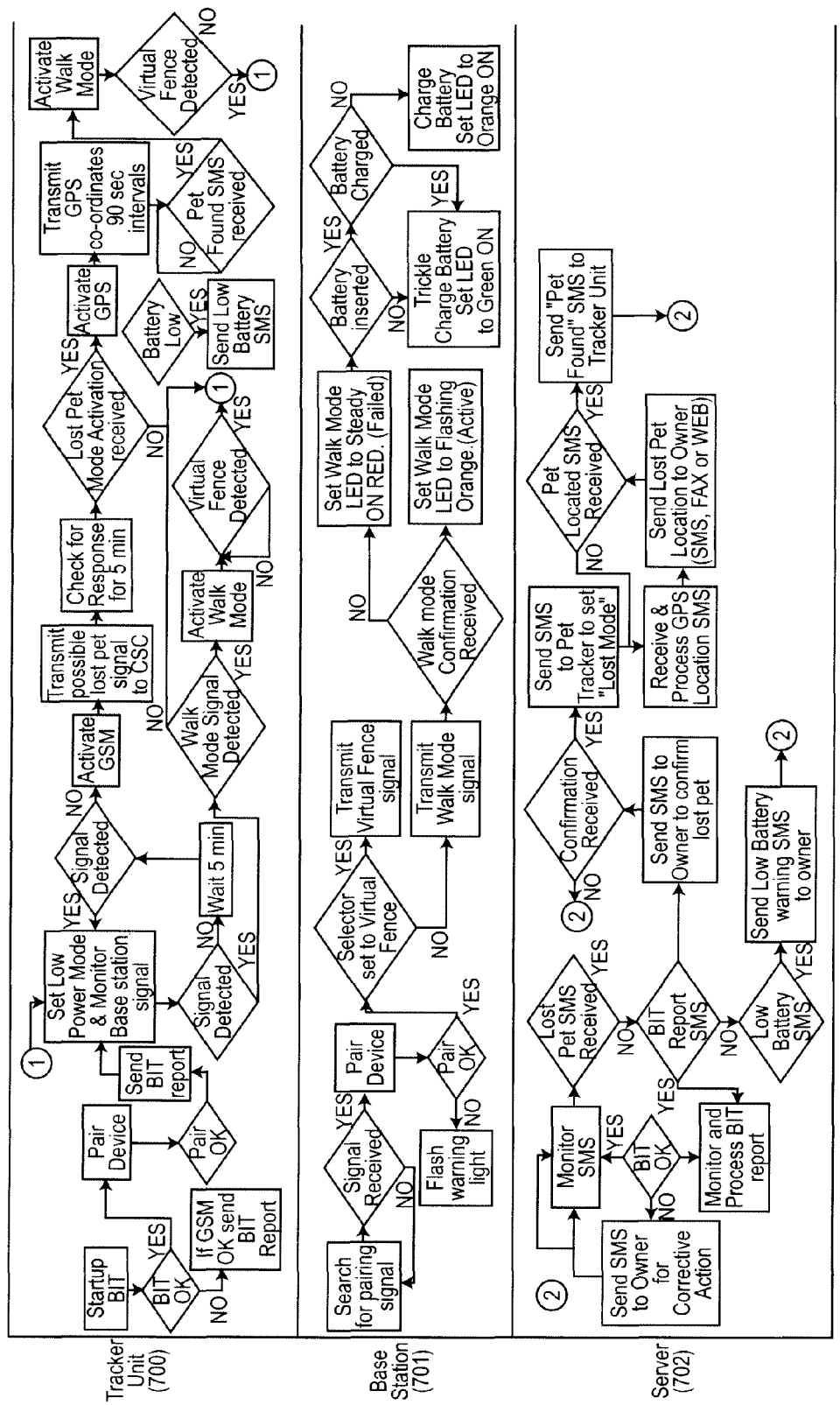
FIG. 7 is a functional flowchart for an embodiment of the invention comprising a tracker unit 700, a base station (701), and a server (702).

An inventive tracking system is operated according to FIG. 7, including tracker unit (700), base station (701) and server (702), as shown. The tracker unit (700) is securely provided for wearing by a pet or other trackee. The base station (701) is established at the trackee's residence or other place where the trackee is supposed to remain without escaping. The server (702) is established at a staffed location.

EXAMPLE 13

Figures 9, 9A:
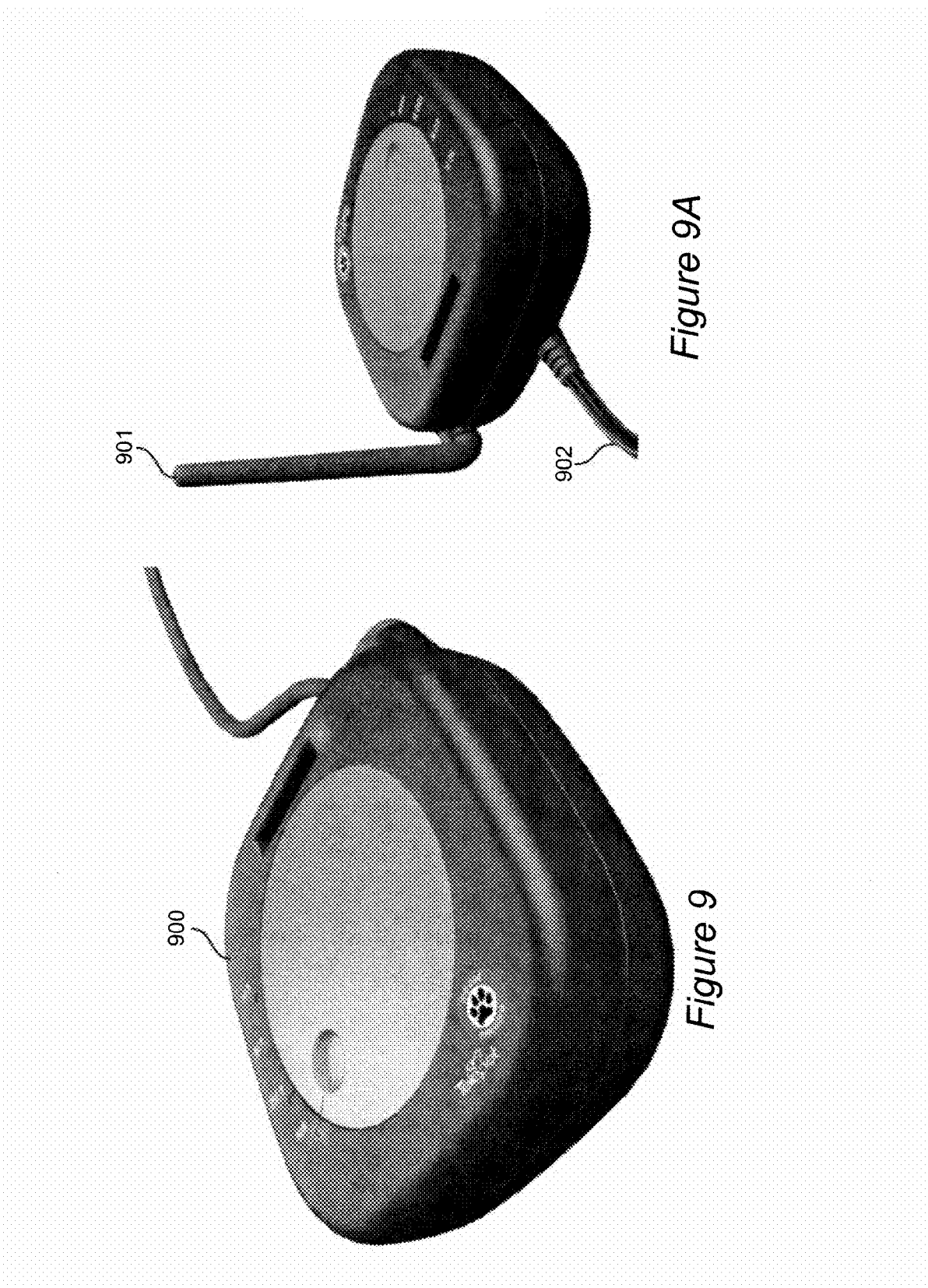
FIG. 9 is a front perspective view of an embodiment of an inventive base station 900, in assembled form (antenna not shown in FIG. 9).
FIG. 9A is a rotated view of the base station 900 of FIG. 9.
Figure 9D:
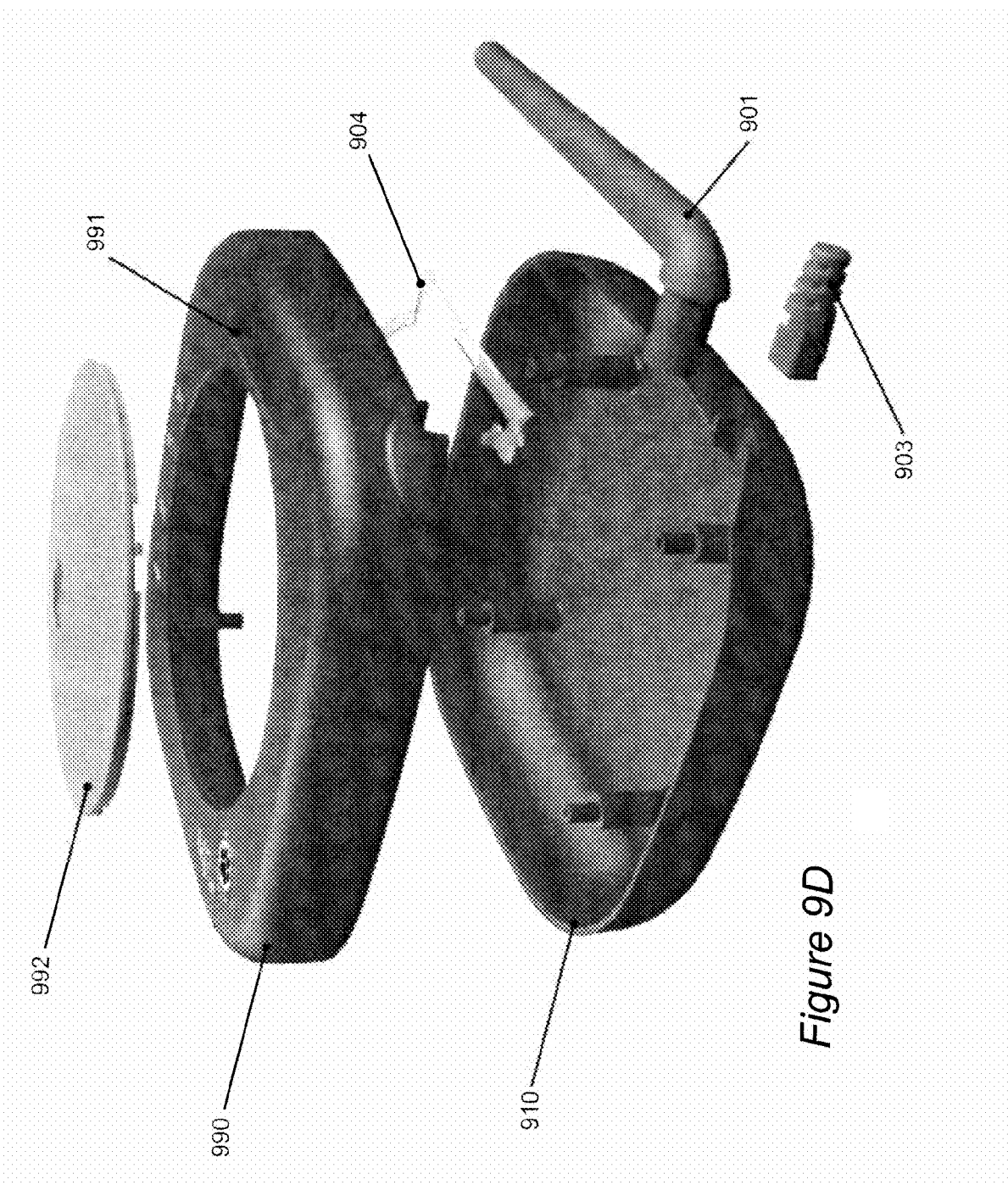
FIG. 9D is an exploded perspective view of base station 900 of FIGS. 9-9C.

Referring to FIGS. 9-9D, an exemplary base station 900 useable in the invention may be appreciated. The base station 900 includes plug 902 by which the base station 900 is plugged into a wall outlet. The base station 900 emits at least one RF signal using the antenna 901.

Referring to FIGS. 9B and 9C, dimensions x, y and z are shown for the base station 900.

Referring to FIG. 9D, base station 900 is assembled as follows. Bottom housing 910 and top housing 990 are provided, and house LED lens 904. The antenna 901 folds to nest in the pack. The base station 900 is assembled with strain relief 903. A battery charging bay 991 is on the top housing 990. A dial 992 fits into the top housing 990. The dial 992 clicks into position for each range setting.

Base station 900 (FIG. 9B) is manually adjustable by a user (pet owner) to a 30 foot radius, a 60 foot radius, or a 150 foot radius, depending on approximate size of the yard area in which the pet is supposed to remain. By setting the base station 900 to one of these radius settings, a first RF signal is emitted to the selected distance.

Base station 900 also includes a "walk" setting (FIG. 9B). When the base station 900 is adjusted by the pet owner to the "walk" setting, the base station ceases to emit the first RF signal and instead begins to emit a second RF signal, wherein the second RF signal is of a different frequency than the first RF signal.

EXAMPLE 13A

Referring again to FIGS. 9-9D, in a preferred example, x=120 mm, y=120 mm and z=43 mm.

It will be appreciated that variations and modifications from the embodiments set forth above may be made without departing from the spirit of the invention, and that such modifications are to be considered within the present invention.

What I claim is:

1. A tracking system, comprising:
   a service center, said service center communicating with one or more remote party devices on a selective basis determined by at least one remote party;
   a tracking module associated with or associatable with an animal, person or object to be tracked, said tracking module comprising
     one or more tracking devices for detecting the geographic location of said tracking module,
     a mobile communication device for communicating with the service center, and
     a first RF transmitter, RF receiver, or RF transceiver;
   a base station having a second RF transmitter, RF receiver, or RF transceiver which sends or receives RF signals from said first RF transmitter, RF receiver, or RF transceiver;
   a communication device, which can be the same or different from said mobile communication device of said tracking module, for
     communicating with said service center when RF signals transmitted between said tracking module and said base station are not received at said tracking module or said base station,
     receiving signals from said service center to selectively activate or de-activate said one or more tracking devices, and
     providing location information of said tracking module obtained from said one or more tracking devices to said service center,
   said service center providing one or more of an activation or deactivation signal to said mobile communication device of said tracking module to activate or deactivate said one or more tracking devices according to instructions from said at least one remote party.

2. A tracking system according to claim 1 further comprising at least one signal repeater or transceiver for repeating RF signals between said base station and said tracking module.

3. A tracking system according to claim 1 further comprising at least a second tracking module associated with or associatable with a second animal, person or object to be tracked, said second tracking module comprising
   one or more tracking devices for detecting the geographic location of said tracking module,
   a mobile communication device for communicating with the service center, and
   a first RF transmitter, RF receiver, or RF transceiver,
   wherein said tracking module and said second tracking module have unique identifiers recognized by said service center.

4. A tracking system according to claim 1 wherein at least one of said one or more remote party devices includes a display, and said display provides location information of said tracking module obtained from said service center, and direction to location information.

5. A tracking system according to claim 4 wherein said direction to location information is obtained from said service center.

6. A tracking system according to claim 1 further comprising a power management module which dynamically adjusts a duration of time between reports on location information.

* * * * *